(No Model.)
A. KLEISER.
COTTON SEED AND CORN PLANTER.
No. 452,674. Patented May 19, 1891.
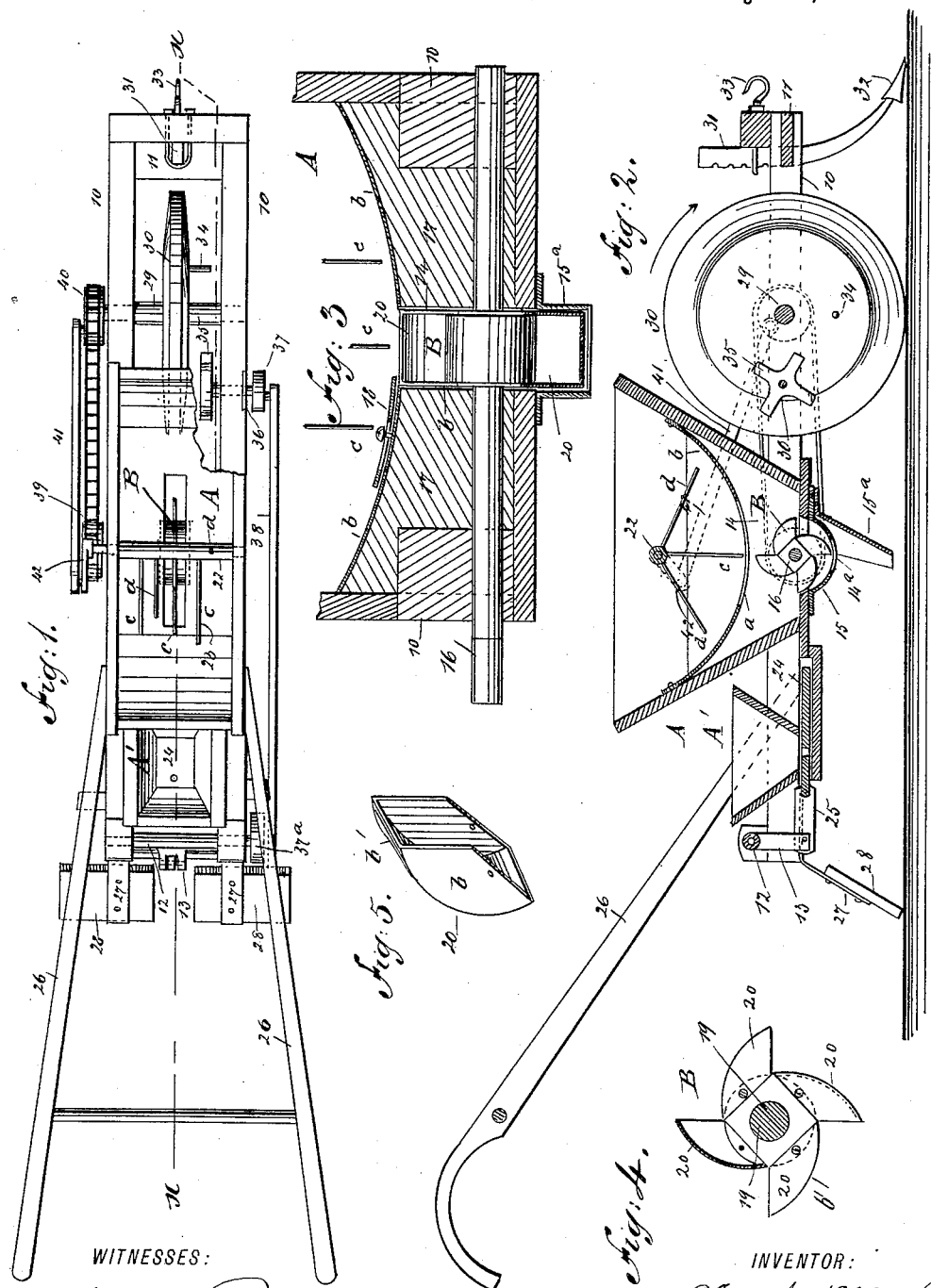
WITNESSES:
Chas. Nida.
E. M. Clark
INVENTOR:
Adolphe Kleiser
BY
ATTORNEYS

UNITED STATES PATENT OFFICE.

ADOLPHE KLEISER, OF PORTLAND, ALABAMA, ASSIGNOR TO HIMSELF AND URIAH T. KENAN, OF SAME PLACE.

COTTON-SEED AND CORN PLANTER.

SPECIFICATION forming part of Letters Patent No. 452,674, dated May 19, 1891.

Application filed July 25, 1890. Serial No. 359,904. (No model.)

*To all whom it may concern:*

Be it known that I, ADOLPHE KLEISER, of Portland, in the county of Dallas and State of Alabama, have invented a new and useful Improvement in Cotton-Seed and Corn Planters, of which the following is a full, clear, and exact description.

My invention relates to an improved corn and cotton-seed planter, and has for its object to provide an implement which will drop the corn or cotton-seed at predetermined intervals and to provide a means whereby the cotton-seed will be separated before being dropped.

The invention consists in the novel construction and combination of the several parts, as will be hereinafter fully set forth, and pointed out in the claims.

Reference is to be had to the accompanying drawings, forming a part of this specification, in which similar letters and figures of reference indicate corresponding parts in all the views.

Figure 1 is a plan view of the implement. Fig. 2 is a section on line $x\ x$ of Fig. 1. Fig. 3 is an enlarged section through the bottom portion of the cotton-seed hopper. Fig. 4 is a partial side elevation and sectional view of the bucket distributing-wheel of the cotton-seed hopper, and Fig. 5 is a perspective view of one of the buckets detached.

The frame of the implement consists of two side pieces 10, united at the front by a crossbar 11. In the rear end of the frame a rock-shaft 12 is journaled, provided at or near its center with a downwardly-extending arm 13.

At or near the center of the frame a hopper A is constructed, adapted to contain the cotton-seed. In the bottom of the hopper at the sides are fitted blocks 17, between which longitudinally of the hopper is formed an opening 14. The upper surfaces of the blocks are concaved in both directions and so that the longitudinal center of the hopper-bottom will be semicircular, as at $a$ in Fig. 2. The upper surface of the blocks is preferably covered with a metal plate $b$, the metal being secured at its edges to the sides of the hopper. To the base of the hopper aligning the opening 14 is secured a shoe 15, having a concave recess in which is an opening $14^a$. Forward of the opening $14^a$ the upper end of a chute $15^a$ is secured to the bottom of the hopper, adapted to receive the seed passing downward through the opening to conduct said seed to the ground. The chute $15^a$ is given a rearward inclination and prevents the wind from blowing the seeds away in their passage from the hopper to the ground.

The cotton-seed hopper A extends quite a distance upward above the frame and in the bottom of the hopper, and likewise in the side pieces of the frame a shaft 16 is journaled, which shaft is provided at or near its center with an attached bucket-wheel B, the said bucket-wheel being adapted to rotate immediately over the opening $14^a$. The space between the blocks 17 is just sufficient to permit the bucket-wheel to revolve without contacting with their edges, as is best shown in Fig. 3, and upon one of the blocks a slide 18 is located, capable of being so adjusted as to entirely cover the wheel or partially cover the same, as may be desired.

The bucket-wheel is of peculiar construction, and the said construction is best illustrated in Figs. 4 and 5. The wheel consists of a circular hub 19, upon which a number of buckets 20 are secured, preferably four in number. The sides of the buckets are somewhat triangular, as illustrated at $b$ in Fig. 5, and the back of each bucket is semicircular, as illustrated at $b'$ in the same figure. The buckets are secured to the side surfaces of the hub by bolts, rivets, or otherwise, whereby they project upward from its periphery.

Although four buckets are illustrated as employed in the construction of the bucket-wheel, I desire it to be understood that three or only two may be used, if desired. When four buckets are employed, the wheel will drop the seed about one foot apart. When three buckets are used, the seed is dropped about fifteen inches apart, and when the wheel is provided with two buckets the seed fall about two feet apart.

In the center of the cotton-seed hopper, transversely of the same and near the top, a shaft 22 is journaled, which shaft is provided with a number of radial fingers 23, the said fingers consisting, preferably, of metal rods flattened or pointed at their lower ends. The fingers are arranged so that when the shaft is standing still, for instance, three of the fingers $c$ will extend downwardly one immediately over the bucket-wheel and the others at each side of the same, and two of the other fingers $d$ are so arranged that one will extend from the shaft in the direction of each end of the hopper, one of the latter fingers being located at one side of the wheel and the other at the opposite side. These fingers are adapted to stir and to separate the seed before the seed is fed to the wheel, as it is well known that a considerable amount of lint adheres to the cotton-seed, and therefore the seeds when placed in the hopper *en masse* cling one to the other. The three fingers $c$ act more to separate the seed than the others do, while the fingers $d$, extending in the direction of the ends of the hopper, as the shaft revolves, tend to feed the seed from the sides downward to the wheel.

Immediately at the rear of the cotton-seed hopper a smaller corn-hopper A' is located within the frame. The corn-hopper is provided with a suitable slide 24 in its bottom, having formed therein the usual drop-opening, and the said slide is connected by a link 25 with the arm 13 of the rock-shaft 12, as is best illustrated in Fig. 2.

At each side of the frame near the rear portion a handle 26 is secured in any suitable or approved manner, and from the rear end of each side piece of the frame a spring-arm 27 is projected downward and rearward. To each of the spring-arms a cover-board 28 is attached, a space being made to intervene the inner opposed edges of the boards.

In front of the cotton-seed hopper and in the side pieces of the frame a forward shaft 29 is journaled, upon which shaft the supporting-wheel 30 of the device is rigidly secured, and in the forward cross-bar 11 of the frame, immediately in front of the peripheral surface of the supporting-wheel, a forwardly and downwardly curved shank 31 is adjustably secured, and to the lower end of the shank a sweep-like blade 32 is attached, the said blade being adapted to create a furrow for the reception of the seed, in which furrow the supporting-wheel travels. Upon the front cross-bar 11 of the frame a block or bar is attached, provided with a hook 33, to which the singletrees are secured.

The supporting-wheel is provided upon one of its sides with a pin 34 extending outward at a right angle therefrom, and the said pin 34 is adapted for engagement with a winged wheel 35, which is held to revolve within the frame and is secured to the inner end of a short shaft 36, the said shaft being provided at its outer end with a crank-disk 37, to which crank-disk one end of the pitman 38 is pivoted, the opposite end of the pitman being attached in like manner to the crank-pin of a disk 37ª on one end portion of the rear rock-shaft 12. Thus whenever the winged wheel is rotated by the pin 34 of the supporting-wheel coming in contact therewith motion is conveyed to the rear rock-shaft 12, and the slide 24 of the corn-hopper is actuated to the extent of one-quarter of its movement to drop the seed.

The shaft 16 of the cotton-seed hopper extends through one side of the same and has attached to its outer end a sprocket-wheel 39, and the shaft 29 is likewise projected outward at the same side and provided with a sprocket-wheel 40. The two sprocket-wheels 39 and 40 are connected by a chain belt.

A pitman 41 is pivoted by means of a suitable wrist-pin upon the outer surface of the sprocket-wheel 40 at one end, and the opposite end of the pitman is pivotally connected with a crank-arm 42, constituting one outer end of the stirrer-shaft 22 of the cotton-seed hopper, as is shown in dotted lines in Fig. 2.

In the operation of the implement as it is drawn forward the cotton-seeds are constantly stirred and separated by the fingers 23 and delivered to the buckets of the bucket-wheel, and the said wheel constantly delivers the seed to the chute 15ª, which guides said seed to the ground. As the supporting-wheel 30 revolves, the winged wheel is made to revolve partially at each revolution of the supporting-wheel, and at each complete revolution of the winged wheel seed is dropped from the corn-hopper, and as the implement advances the seed is covered by means of the boards 28. As the said boards are two in number and quite a distance intervenes between them, they are not obstructed by cornstalks or trash that may be upon the ground. If the discharge-aperture in the corn-hopper should be placed near the back, the first quarter-revolution of the wing-wheel will carry the drop-slide some distance rearward, and the next movement of the wing-wheel causes the drop-aperture in the slide to register with the discharge-aperture of the hopper and the seed falls in the furrow. The next two movements of the wing-wheel carry the drop-slide forward again in the hopper. Thus the wing-wheel will make a complete revolution before it drops corn, and if the supporting-wheel is sixteen inches in diameter and revolves four times before the wing-wheel acts to discharge the corn the distance between the corn will be fifteen feet. It is customary to plant some corn between the cotton, about fifteen to eighteen feet apart, in order not to injure the cotton-crop, and the implement described is especially adapted for that purpose.

I am aware it is not new to construct implements to plant cotton in continuous drills, and in such instances many of the cotton-plants must be removed to create proper distance between them, involving much labor and a waste of seed. This trouble is obviated by my implement, which plants the seed at intervals.

Having thus described my invention, I claim as new and desire to secure by Letters Patent—

1. In a planter, the combination, with a frame and supporting-wheel provided with a laterally-projecting pin, a hopper, and a feed-slide in the bottom thereof, of a winged wheel mounted in the frame and adapted to be engaged by the pin of the supporting-wheel, a rock-shaft, a connection between the said shaft and feed-slide, and a pitman connected to the rock-shaft and to a crank on the shaft of the winged wheel, substantially as herein shown and described.

2. In an implement of the character described, the combination, with a frame, a supporting-wheel journaled in said frame and provided with a projecting pin at one side, and a rock-shaft journaled in the rear of the frame and having a crank-arm at one end, of a hopper located near the rock-shaft and provided with a drop-slide, a connection between the drop-slide and the rock-shaft, a shaft journaled in the frame near the supporting-wheel, a winged wheel attached to one end of said shaft and adapted to be engaged by the pin of the supporting-wheel, a crank-disk attached to the opposite end of the shaft, and a pivotal connection between the crank-disk and the crank-arm of the rock-shaft, substantially as shown and described.

3. In an implement of the character described, the combination, with a frame, a supporting-wheel journaled in said frame and provided with a projecting pin at one side, and a rock-shaft journaled in the rear of the frame and having a crank-arm at one end, of a hopper located near the rock-shaft and provided with a drop-slide, a connection between the drop-slide and the rock-shaft, a shaft journaled in the frame near the supporting-wheel, a winged wheel attached to one end of said shaft and adapted to be engaged by the pin of the supporting-wheel, a crank-disk attached to the opposite end of the shaft, a pivotal connection between the crank-disk and the crank-arm of the rock-shaft, a spring-shank projected downward and rearward from the rear extremity of each side piece of the frame, and a cover-board attached to each spring-shank, as and for the purpose specified.

4. In an implement of the character described, the combination, with a frame, a cotton-seed hopper located near the center of the frame and provided with an opening in its bottom, a distributing-wheel journaled in the cotton-seed hopper above the opening and consisting of a hub and buckets radiating from the hub, a stirrer-shaft journaled in the cotton-seed hopper above the distributing-wheel and provided with a series of radial stirrer-fingers, and a corn-hopper located within the frame at the rear of the cotton-seed hopper and provided with a drop-slide, of a rear rock-shaft, a link connection between the rock-shaft and the drop-slide of the corn-hopper, a supporting-wheel journaled in the frame in front of the cotton-seed hopper and provided with a pin upon one face, a shaft journaled in the frame near the supporting-wheel provided with a winged wheel at one end and a crank-disk at its opposite end, a pitman connection between the crank-disk and the rock-shaft, an adjustable sweep attached to the frame in front of the supporting-wheel, spring cover-boards attached to the rear of the frame, and a driving mechanism connecting the shaft of the supporting-wheel, the stirrer-shaft, and the shaft of the distributing-wheel, substantially as shown and described, and for the purpose specified.

ADOLPHE KLEISER.

Witnesses:
E. C. KENAN,
HENRY B. HOLCOMB.